United States Patent [19]
Williams et al.

[11] Patent Number: 5,899,700
[45] Date of Patent: May 4, 1999

[54] EMBEDDED MULTIMEDIA CONTROL CODE METHOD AND APPARATUS

[75] Inventors: John C. Williams, San Mateo; Douglas A. Keyston, Hillsborough, both of Calif.

[73] Assignee: Didacticom Partners, Hillsborough, Calif.

[21] Appl. No.: 08/935,370

[22] Filed: Sep. 22, 1997

[51] Int. Cl.[6] ............................................. G11B 7/00
[52] U.S. Cl. .......................... 434/308; 434/169; 434/315; 434/317; 434/307 R; 382/306; 706/927; 345/145
[58] Field of Search ..................................... 434/118, 169, 434/178, 185, 307 R, 308, 315, 316, 317, 318, 319, 365; 382/306, 309, 312, 318, 320, 181; 369/1–5, 14; 395/702; 706/927; 345/302, 145, 168

[56] References Cited

U.S. PATENT DOCUMENTS

| | | | |
|---|---|---|---|
| 4,406,626 | 9/1983 | Anderson et al. | 434/308 X |
| 4,518,361 | 5/1985 | Conway | 434/308 |
| 4,602,152 | 7/1986 | Dittakavi | 434/185 X |
| 4,681,548 | 7/1987 | Lemelson | 434/308 X |
| 4,809,246 | 2/1989 | Jeng | 434/317 |
| 4,994,987 | 2/1991 | Baldwin | 434/315 X |
| 5,001,696 | 3/1991 | Baldwin | 434/308 X |
| 5,059,126 | 10/1991 | Kimball | 369/97 X |
| 5,293,358 | 3/1994 | Krause | 434/308 |
| 5,575,659 | 11/1996 | King et al. | 434/178 X |

*Primary Examiner*—Joe H. Cheng
*Attorney, Agent, or Firm*—Feix & Feix

[57] ABSTRACT

Methods and apparatus of integrating multimedia materials with didactic printed materials present selected relevant multimedia material in response to the sensing of control codes embedded in context sensitive and/or content sensitive didactic printed material. A store of multimedia information is created, and the store is correlated to related context and/or content sensitive didactic printed material. The store is categorized to transmit certain categories of the stored information from the store to a multimedia display in response to the reception of certain input signals obtained from certain codes embedded in the didactic printed material. The printed didactic material controls the display of the multimedia material. Either preexisting didactic printed material or currently created didactic printed material can be efficiently and economically integrated with multimedia materials to display certain selected multimedia materials at sensitive places of the printed materials.

50 Claims, 4 Drawing Sheets

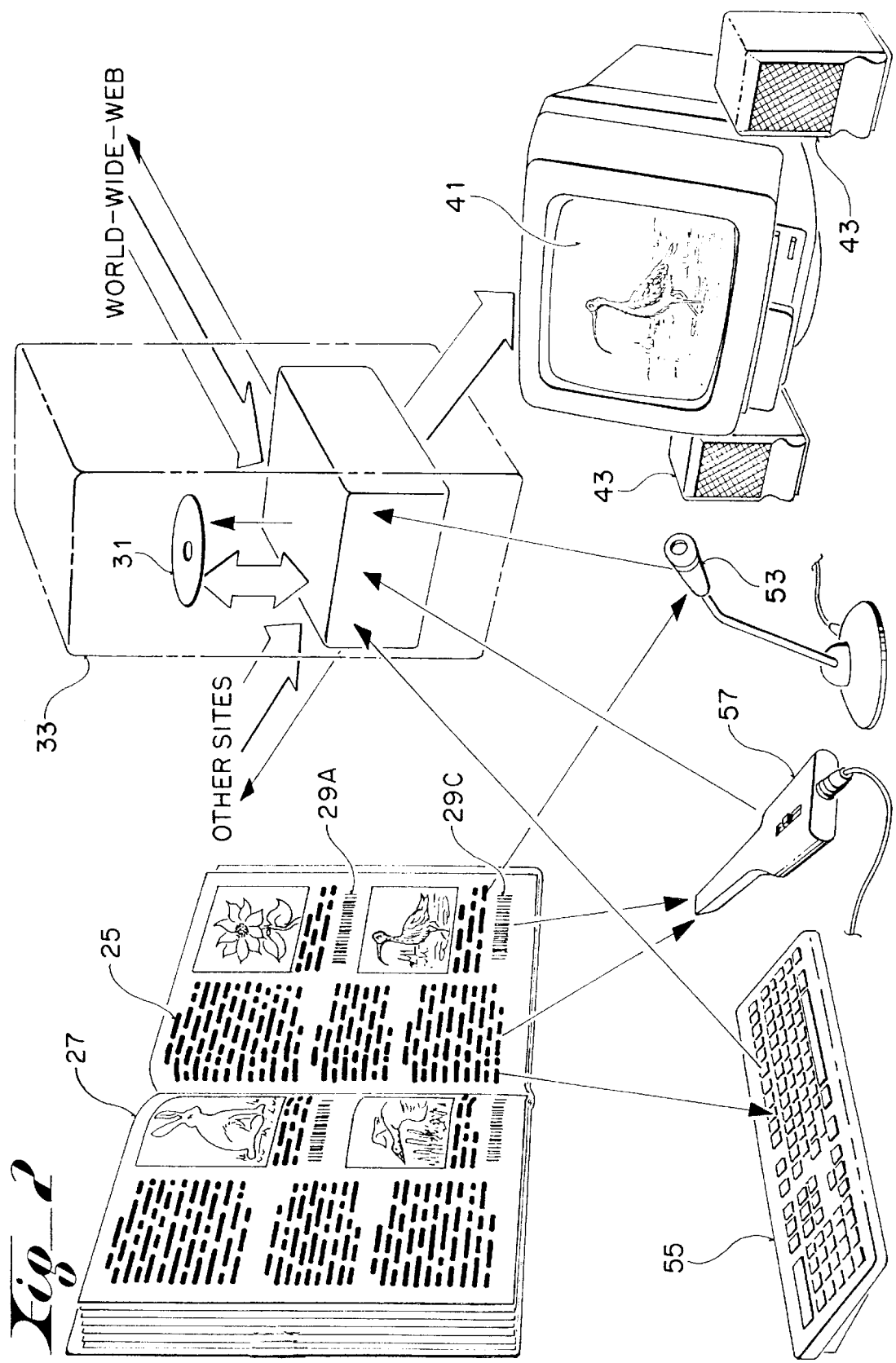

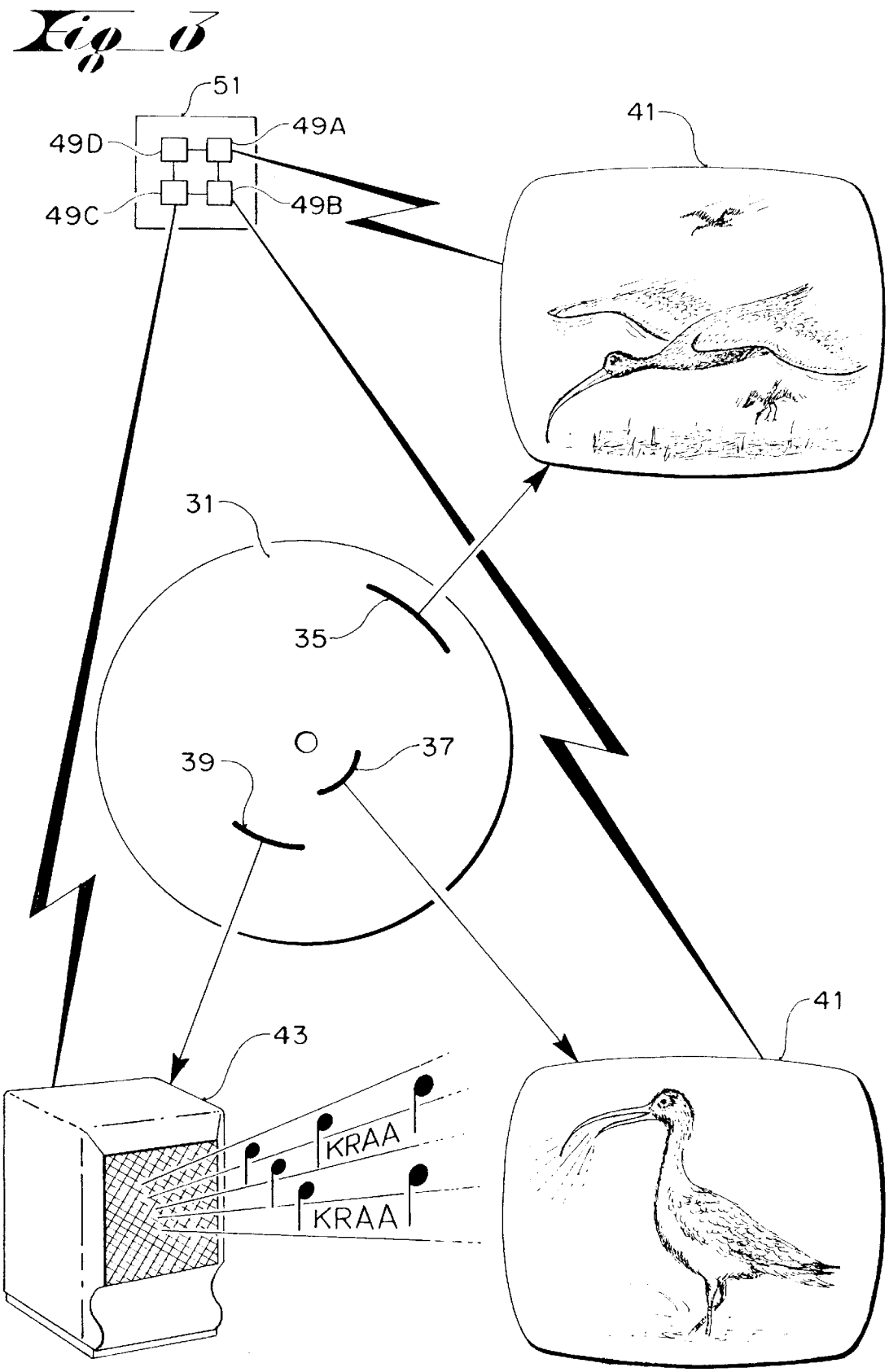
Fig_6

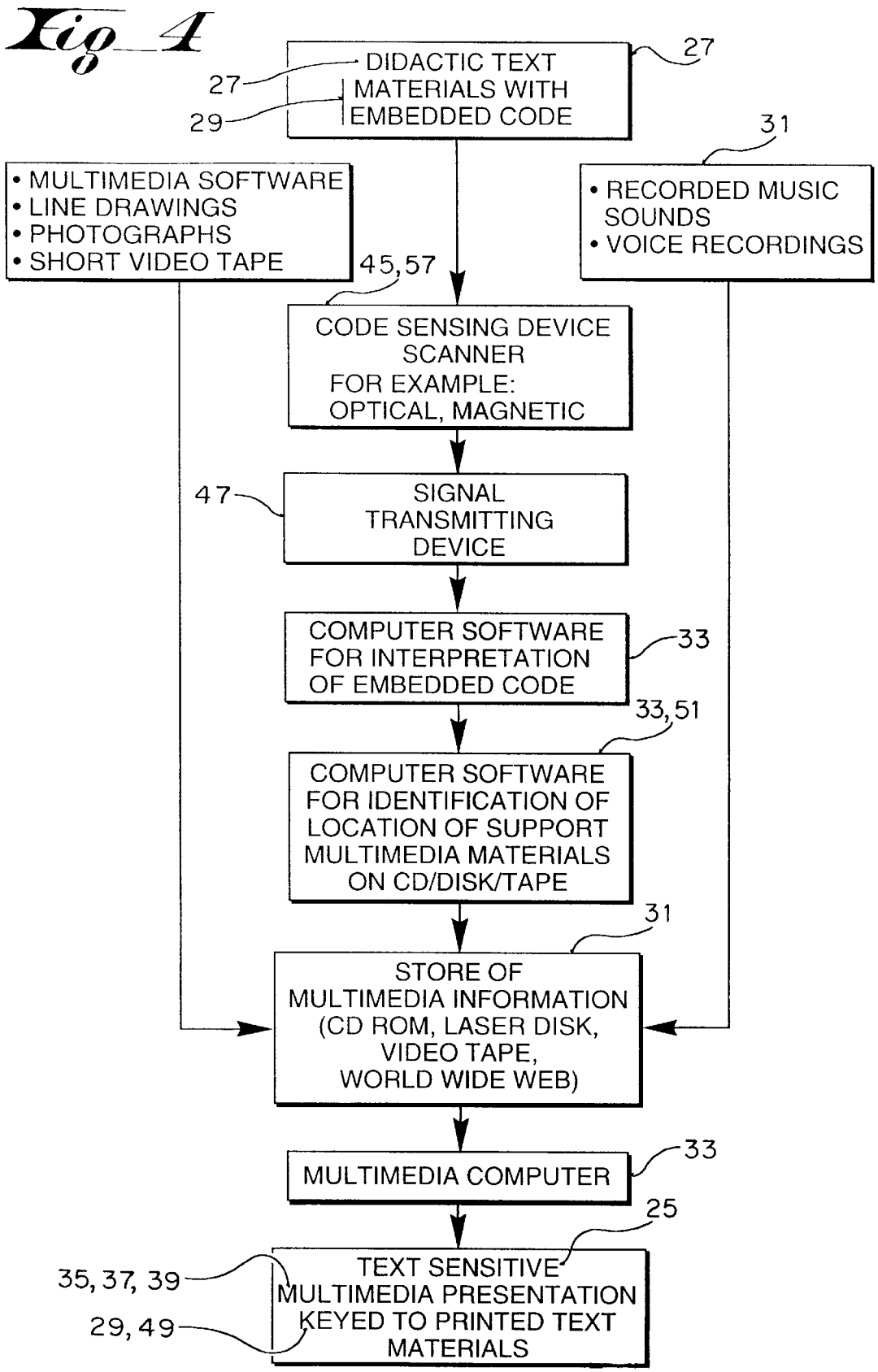

EMBEDDED MULTIMEDIA CONTROL CODE METHOD AND APPARATUS

BACKGROUND OF THE INVENTION

The invention relates to methods and apparatus for integrating multimedia materials with didactic printed materials.

This invention relates particularly to methods and apparatus for presenting selected relevant multimedia material in response to the sensing of control codes which are embedded in context sensitive and/or content sensitive didactic printed material.

SUMMARY OF THE INVENTION

It is a primary object of the present invention to create a store of multimedia information which is categorized and correlated to related context sensitive and/or content sensitive didactic printing material and to transmit certain categories of the stored information to a multimedia display in response to certain input signals obtained from certain codes embedded in the didactic printed material.

In the method and apparatus of the present invention certain codes are embedded in or adjacent to certain locations of didactic printed material.

Each code is correlated to a certain category of the information in the store so that the certain category of stored multimedia information is displayed only when the particular code is sensed in the course of reading that portion of the text material.

Upon the sensing of a particular code, an input signal corresponding to that sensed code is transmitted to the store.

The input signal as received at the store causes the store to transmit a particular category of the stored information to the display. The selected category of stored multimedia information is therefore displayed concurrently with the reading of the related text so that the displayed multimedia information illustrates and/or elaborates on the text information. This can provide a more varied and complete understanding and appreciation of the material discussed in the text.

In the method and apparatus of the present invention the printed didactic material controls the display of the multimedia material.

In the present invention either preexisting didactic printed material or currently created didactic printed material can be efficiently and economically integrated with multimedia materials to display certain selected multimedia materials at context sensitive and/or content sensitive places of the printed materials. Codes may be added to existing printed material, or codes can be selected from certain text features of existing printed material. In the case of currently created printed material, the codes may be added or selected as the material is being created.

Methods and apparatus which incorporate the features described above and which are effective to function as described above constitute further, specific objects of the invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 is an overall, perspective view showing one embodiment of a method and apparatus constructed in accordance with the present invention. The embodiment of the method and apparatus shown in FIG. 1 integrates multimedia materials with didactic printed materials to present selected relevant multimedia material in response to the sensing of control codes embedded in context sensitive and/or content sensitive didactic printed material.

FIG. 2 is a perspective, diagrammatic view showing details of certain components and certain inter-associations of the components of the invention illustrated in FIG. 1.

FIG. 3 is a top plan view of a storage disk (such as, for example, a magnetic disk or a CD-ROM disk) containing a created store of certain selected multimedia information. The disk contains certain categories of multimedia information stored at specified locations (e.g., the three arcuately curved sectors) on the storage disk. FIG. 3 indicates (in the monitor displays indicated by the direction arrows leading from the respective storage sectors) the particular category of relevant multimedia material which is stored at the respective sectors. FIG. 3 also illustrates (in the upper left hand corner of FIG. 3) how a file allocation table or other control structure contains instructions which, when activated by a signal from a specific embedded control code, is effective to call-up a selected sector for the display of the multimedia material contained in that sector. This call-up is indicated by the zig-zag shaped line connecting each illustrated display screen with its respective instruction set.

FIG. 4 is a table illustrating how the elements of the apparatus and method of the present invention are sequenced and are associated for integrating multimedia materials with didactic printed materials to present selected relevant multimedia material in response to the sensing of control codes embedded in context sensitive and/or content sensitive didactic printed material.

DETAILED DESCRIPTION OF THE PREFERRED EMBODIMENTS

Figure 1:
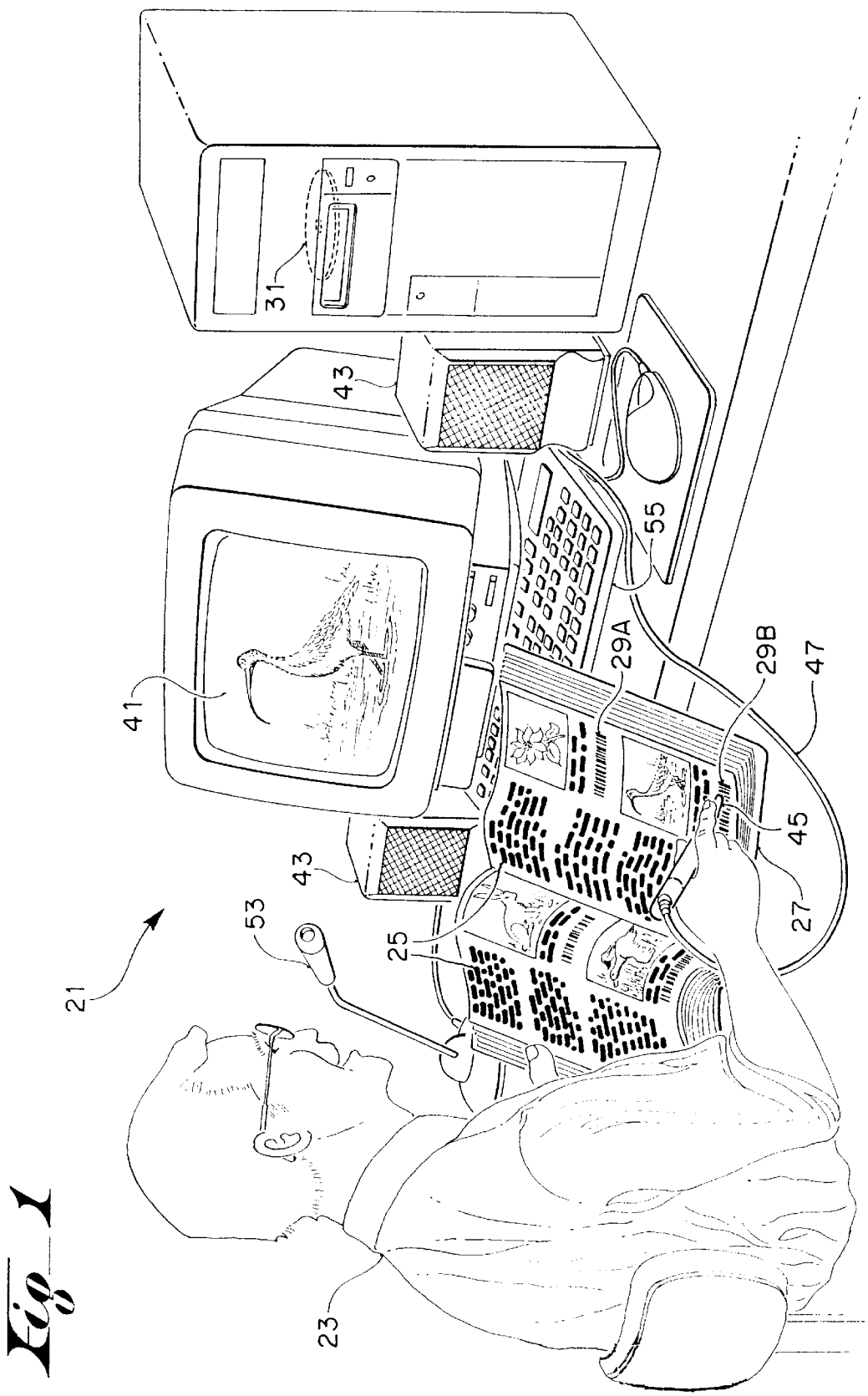

FIG. 1 is a perspective view showing one embodiment 21 of an apparatus and method for integrating multimedia materials with didactic printed materials so as to be able to present selected relevant multimedia material in response to the sensing of control codes embedded in context sensitive or content sensitive didactic printed material.

The embodiment 21 of the present invention creates a store of multimedia information which is correlated to related context sensitive or content sensitive didactic printed material.

The created store of multimedia information is categorized in a way that permits the store to transmit certain categories of the stored information to a multimedia display in response to the reception of certain input signals obtained from certain codes embedded in the didactic printed material. The codes are embedded in the didactic printed material at certain context sensitive or content sensitive locations.

The present invention incorporates sensing means for sensing the embedded code and for generating an input signal.

Transmitting means transmit the input signal to the store.

When the input signal is received at the store, a certain category of the stored information is selected and is transmitted to a multimedia display.

In the present invention the printed didactic material controls the display of the multimedia material.

Either preexisting didactic printed material or currently created didactic printed material can be efficiently and economically integrated with multimedia materials to display certain selected, relevant multimedia materials at sensitive places of the printed material.

In FIG. 1 a person 23 is shown reading didactic printed text material 25 contained within a book 27.

Certain codes are embedded in the printed material 25 at certain context sensitive and/or content sensitive locations. Thus, as illustrated in FIG. 1, a bar code 29(A) is embedded in the portion of the printed material 25 in the upper part of the right hand page. Another bar code 29(B) is embedded in the lower part of the text on that page.

The purpose of having the codes embedded in the didactic printed material at the places indicated is to permit relevant categories of multimedia display to be presented in conjunction with the reading of the text of the didactic printed materials.

To be able to display a particular category of stored information in response to the sensing of the embedded control codes, a store of categorized multimedia information must be created, and the categories of the stored information must be correlated to related context sensitive and/or content sensitive parts of the didactic printed material.

In the embodiment illustrated in FIG. 1 a categorized store of multimedia information is created and is stored on a disk 31 of a computer system 33 (see FIG. 2).

The disk 31 may, for example, be a CD-ROM disk or a magnetic disk or a laser disk.

As best illustrated in FIG. 3, the disk 31 has discrete sectors such as the sectors 35, 37, and 39. Each discrete sector contains a certain category of multimedia information and is stored at a specific location on the storage disk 3 1.

As illustrated in FIG. 1, the computer system 33 includes a display 41 for displaying the particular category of multimedia information when the particular sector containing that category is called up for display.

As illustrated in FIG. 2 and FIG. 1, the computer system 33 also includes audio speakers 43 for playing audio information contained within a particular categorized sector of information.

In accordance with the present invention each embedded code is effective to transmit a specific input signal to the computer system 33 in response to the sensing of that particular code in the course of reading or scanning the printed material.

As illustrated in FIG. 1, a bar code reader pen 45 scans the embedded code 29(B) and transmits an input signal through the line 47 to the computer system 33.

As shown in FIG. 3, this input signal is processed by the computer system 33, and the computer activates a particular segment 49(B) of a file allocation table (or other control structure) 51 to call up the information stored at the sector 37. This, in turn, causes the categorized information stored at the sector 37 to be displayed on the display 41.

In the particular instance illustrated in FIGS. 1 and 3, the categorized multimedia information which is displayed is multimedia information relating to a particular type of waterbird. The information may, for example, contain both video and audio information of that particular waterbird.

Such video and audio multimedia information can visually and audibly supplement and add to the information contained in the didactic printed material at the portion of the text in the book 27.

The printed didactic material and the codes embedded in the printed didactic material control the display of the multimedia material.

Either preexisting didactic printed material or currently created didactic printed material can be efficiently and economically integrated with multimedia materials to display certain selected multimedia materials at sensitive places of the printed materials.

The sensitive places can be content sensitive places.

The sensitive places can be context sensitive places.

The sensitive places can be combinations of content and context sensitive places.

In accordance with the present invention, the printed didactic materials can be preexisting printed materials. The embedded code means can be added to the preexisting printed materials or selected from printed material already present in the preexisting materials to enable materials already in print to be updated so as to permit controlled display of information from a created store of multimedia information and also to enable the information which is displayed to be correlated to related context sensitive and/or content sensitive parts of the didactic printed material.

The present invention can also embed code in didactic printed materials as the printed materials are being created.

The store of multimedia information can be created to incorporate a variety of multimedia types of information stored in a wide variety of ways, mechanisms and locations.

The store of multimedia information can, as described above, be stored on a CD-ROM disk, magnetic disk, or laser disk.

The information can be stored in non-volatile memory.

The information can be stored on an audio tape of an audio tape player.

The information can be stored at a website of a global communications network (as illustrated in the top right hand comer of FIG. 2).

The information can be stored at other sites, such as, for example, school libraries or storage facilities of a local area network(as indicated in FIG. 2).

The information can be stored on a video tape of a video tape recorder.

In FIG. 1 the embedded code is illustrated as comprising bar codes located adjacent to certain sensitive places of the didactic printed material.

In accordance with the present invention, the embedded code can comprise a number of other code types and mechanisms.

For example, the embedded code may be numeric codes located adjacent to certain sensitive places of the didactic printed material.

The embedded code may comprise captions located adjacent to certain sensitive places of the didactic printed material.

The embedded code may comprise certain letter strings at or within certain sensitive places of the didactic printed material.

The embedded code may comprise certain bolded letter strings located at or within certain sensitive places of the didactic printed material.

The embedded code may comprise certain italicized letter strings located at or within certain sensitive places of the didactic printed material.

The embedded code may comprise magnetic code located at or within certain sensitive places of the didactic printed material.

Various sensing means may be used for scanning and transmitting signals relating to the embedded code.

For example, the embedded code may be visually scanned with the eye of the reader 23; and the reader can then transmit the input signal corresponding to that sensed code to the store. The reader can, for example, transmit the signal verbally, through a microphone 53, or manually, through a keyboard 55, or through a bar code reader pen 45, as illustrated in FIG. 1, or through a bar code reader 57 (see FIG. 2) or by infrared sensing means or by other sensing and transmitting mechanisms.

FIG. 4 is a diagrammatic table illustrating how the elements of the apparatus and method of the present invention are sequenced and are inter-associated for integrating multimedia materials with didactic printed materials to present selected relevant multimedia material in response to the sensing of control codes embedded in context sensitive and/or content sensitive didactic printed material.

Components which have been illustrated in FIGS. 1–3 and which correspond to the components indicated by the descriptive terms in FIG. 4 are indicated by similar reference numerals in FIGS. 1–3 and FIG. 4.

FIG. 4 thus is a graphical, flow chart, sequencing diagram showing the operation of the method and apparatus of the present invention.

In summary, the method and apparatus of integrating multimedia materials with didactic printed materials of the present invention provide a system in which the printed didactic material controls the display of the multimedia material.

Either preexisting didactic material or currently created didactic printed material can be provided with embedded codes so that the printed material can be efficiently and economically integrated with multimedia materials to display certain selected multimedia materials at sensitive places of the printed materials.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A method of integrating multimedia materials with didactic printed materials to present selected relevant multimedia material in response to the sensing of control codes embedded in context or content sensitive didactic printed material, said method comprising, creating a store of multimedia information which is correlated to related context or content sensitive didactic printed material and which is categorized to transmit certain categories of the stored information from the store to a multimedia display in response to the reception of certain input signals obtained from certain codes embedded in said didactic printed material, sensing a code embedded in said didactic printed material, transmitting an input signal corresponding to that sensed code to said store, receiving the transmitted input signal at the store, transmitting a certain category of the stored information to the multimedia display in response to the reception of the input signal, and displaying the transmitted category of multimedia information on the display, whereby the printed didactic material controls the display of the multimedia material and either preexisting didactic printed material or currently created didactic printed material can be efficiently and economically integrated with multimedia materials to display certain selected multimedia materials at sensitive places of the printed materials.

2. The invention defined in claim 1 wherein the sensitive places are content sensitive places.

3. The invention defined in claim 1 wherein the sensitive places are context sensitive places.

4. The invention defined in claim 1 wherein the printed didactic materials are preexisting printed materials and including embedding codes in said preexisting printed materials.

5. The invention defined in claim 1 including embedding codes in the printed didactic materials as the printed materials are being created.

6. The invention defined in claim 1 wherein the store of multimedia information includes information stored on a CD ROM.

7. The invention defined in claim 1 wherein the store of multimedia information includes information stored in nonvolatile memory.

8. The invention defined in claim 1 wherein the store of multimedia information includes information stored on a hard drive of a computer.

9. The invention defined in claim 1 wherein the store of multimedia information includes information stored on an audio tape of an audio tape player.

10. The invention defined in claim 1 wherein the store of multimedia information includes information stored at a web site of a global communications network.

11. The invention defined in claim 1 wherein the store of multimedia information includes audio and visual information.

12. The invention defined in claim 1 wherein the store of multimedia information includes information stored on a video tape of a video tape recorder.

13. The invention defined in claim 1 wherein the store of multimedia information includes information stored on a laser disk.

14. The invention defined in claim 1 wherein the embedded code comprises bar codes located adjacent to certain sensitive places of the didactic printed material.

15. The invention defined in claim 1 wherein the embedded code comprises numeric codes located adjacent to certain sensitive places of the didactic printed material.

16. The invention defined in claim 1 wherein the embedded code comprises captions located adjacent to certain sensitive places of the didactic printed material.

17. The invention defined in claim 1 wherein the embedded code comprises certain letter strings located at or within certain sensitive places of the didactic printed material.

18. The invention defined in claim 1 wherein the embedded code comprises certain bolded letter strings located at or within certain sensitive places of the didactic printed material.

19. The invention defined in claim 1 wherein the embedded code comprises certain italicized letter strings located at or within certain sensitive places of the didactic printed material.

20. The invention defined in claim 1 wherein the embedded code comprises magnetic code located at or within certain sensitive places of didactic printed material.

21. The invention defined in claim 1 wherein sensing the embedded code includes scanning the embedded code with a light wand scanner.

22. The invention defined in claim 1 wherein sensing the embedded code includes visually scanning the embedded code with the eye of the reader of the didactic printed material and then transmitting said input signal corresponding to that sensed code to said store.

23. The invention defined in claim 1 wherein sensing the embedded code includes visually scanning the embedded code with the eye of the reader of the didactic printed material and then transmitting said input signal corresponding to that sensed code to said store by typing information on the keyboard or keypad of a computer.

24. The invention defined in claim 1 wherein sensing the embedded code includes visually scanning the embedded code with the eye of the reader of the didactic printed material and then transmitting said input signal corresponding to that sensed code to said store by speaking information into a microphone.

25. The invention defined in claim 1 wherein the display is an audio visual display device which is capable of displaying certain animation, voice, music, sounds, charts, text, motion, film and other information relevant to the certain didactic printed materials associated with a certain embedded and sensed code and transmitted input signal.

26. Apparatus for integrating multimedia materials with didactic printed materials to present selected relevant multimedia material in response to the sensing of control codes embedded in context or content sensitive didactic printed material, said apparatus comprising, a created store of multimedia information which is correlated to related context or content sensitive didactic printed material and which is categorized to transmit certain categories of the stored information from the store to a multimedia display in response to the reception of certain input signals obtained from certain codes embedded in said didactic printed material, embedded code means comprising certain codes embedded in said didactic printed material at certain context or content sensitive locations, sensing means for sensing a code embedded in said didactic printed material, signal transmitting means for transmitting an input signal corresponding to the sensed code to said store, receiving means for receiving the transmitted input signal at the store, categorized information transmitting means for transmitting a certain category of the stored information to the multimedia display in response to the reception of the input signal, and displaying means for displaying the transmitted category of multimedia information on the display, whereby the printed didactic material controls the display of the multimedia material and either preexisting didactic printed material or currently created didactic printed material can be efficiently and economically integrated with multimedia materials to display certain selected multimedia materials at sensitive places of the printed materials.

27. The invention defined in claim 26 wherein the sensitive places are content sensitive places.

28. The invention defined in claim 26 wherein the sensitive places are context sensitive places.

29. The invention defined in claim 26 wherein the printed didactic materials are preexisting printed materials and wherein the embedded code means were added to said preexisting printed materials.

30. The invention defined in claim 26 wherein the embedded code means were embedded in the printed didactic materials as the printed materials were created.

31. The invention defined in claim 26 wherein the store of multimedia information includes information stored on a CD ROM.

32. The invention defined in claim 26 wherein the store of multimedia information includes information stored in nonvolatile memory.

33. The invention defined in claim 26 wherein the store of multimedia information includes information stored on a hard drive of a computer.

34. The invention defined in claim 26 wherein the store of multimedia information includes information stored on an audio tape of an audio tape player.

35. The invention defined in claim 26 wherein the store of multimedia information includes information stored at a web site of a global communications network.

36. The invention defined in claim 26 wherein the store of multimedia information includes audio and visual information.

37. The invention defined in claim 26 wherein the store of multimedia information includes information stored on a video tape of a video tape recorder.

38. The invention defined in claim 26 wherein the store of multimedia information includes information stored on a laser disk.

39. The invention defined in claim 26 wherein the embedded code comprises bar codes located adjacent to certain sensitive places of the didactic printed material.

40. The invention defined in claim 26 wherein the embedded code comprises numeric codes located adjacent to certain sensitive places of the didactic printed material.

41. The invention defined in claim 26 wherein the embedded code comprises captions located adjacent to certain sensitive places of the didactic printed material.

42. The invention defined in claim 26 wherein the embedded code comprises certain letter strings located at or within certain sensitive places of the didactic printed material.

43. The invention defined in claim 26 wherein the embedded code comprises cranbolded letter strings located at or within certain sensitive places of the didactic printed material.

44. The invention defined in claim 26 wherein the embedded code comprises certain italicized letter strings located at or within certain sensitive places of the didactic printed material.

45. The invention defined in claim 26 wherein the embedded code comprises magnetic code located at or within certain sensitive places of the didactic printed material.

46. The invention defined in claim 26 wherein the sensing means include a light wand for scanning the embedded code.

47. The invention defined in claim 26 wherein the embedded code is visually scanned with the eye of the reader of the didactic printed material and wherein the reader then transmits said input signal corresponding to that sensed code to said store.

48. The invention defined in claim 47 wherein the signal transmitting means include keys for transmitting said input signal corresponding to that sensed code to said store by typing information on the keyboard or keypad of a computer.

49. The invention defined in claim 47 wherein the signal transmitting means include a microphone for transmitting said input signal to said created store of multimedia information.

50. The invention defined in claim 26 wherein the displaying means include an audio visual display device which is capable of displaying certain animation, voice, music, sounds, charts, text, motion, film and other information relevant to the certain didactic printed materials associated with a certain embedded and sensed code and transmitted input signal.

* * * * *